United States Patent
Camacho et al.

(10) Patent No.: US 9,094,361 B2
(45) Date of Patent: Jul. 28, 2015

(54) CONVERSATION-INTEGRATED ACTION ITEMS IN SOCIAL NETWORKS

(71) Applicants: Michael Camacho, Portland, OR (US); Olivia Teich, Menlo Park, CA (US)

(72) Inventors: Michael Camacho, Portland, OR (US); Olivia Teich, Menlo Park, CA (US)

(73) Assignee: JIVE SOFTWARE, Inc., Portland, OR (US)

( * ) Notice: Subject to any disclaimer, the term of this patent is extended or adjusted under 35 U.S.C. 154(b) by 262 days.

(21) Appl. No.: 13/952,456

(22) Filed: Jul. 26, 2013

(65) Prior Publication Data
US 2015/0033155 A1     Jan. 29, 2015

(51) Int. Cl.
*G06Q 10/10*     (2012.01)
*H04L 12/58*     (2006.01)

(52) U.S. Cl.
CPC .............. *H04L 51/32* (2013.01); *H04L 12/581* (2013.01)

(58) Field of Classification Search
CPC ............................... G06Q 10/10; G04L 12/581
USPC ........................................................ 715/758
See application file for complete search history.

(56) References Cited

U.S. PATENT DOCUMENTS

| | | | | |
|---|---|---|---|---|
| 5,208,748 | A * | 5/1993 | Flores et al. | 704/1 |
| 8,185,944 | B2 * | 5/2012 | Schnackenberg et al. | 726/12 |
| 2011/0112899 | A1 * | 5/2011 | Strutton et al. | 705/14.41 |
| 2011/0130114 | A1 * | 6/2011 | Boudville | 455/404.2 |
| 2011/0145823 | A1 * | 6/2011 | Rowe et al. | 718/100 |
| 2012/0158865 | A1 * | 6/2012 | Kurian et al. | 709/206 |
| 2012/0159488 | A1 * | 6/2012 | Kurian et al. | 718/100 |
| 2013/0014026 | A1 * | 1/2013 | Beringer et al. | 715/753 |
| 2013/0166280 | A1 * | 6/2013 | Quast et al. | 704/9 |
| 2015/0058372 | A1 * | 2/2015 | Nagarajan et al. | 707/758 |
| 2015/0074045 | A1 * | 3/2015 | Belfils et al. | 707/609 |

OTHER PUBLICATIONS

Carenini, "Visual Structured Summaries of Human Conversations", IVITA'10, Feb. 7, 2010.*

* cited by examiner

*Primary Examiner* — Reza Nabi

(57) ABSTRACT

A device and a method are disclosed including Conversation-Integrated Action System (CIAS) having networking facilities to allow multiple remote users of a social network to enter into a social conversation. CIAS is further configured to allow specific and relevant actions to be presented to achieve specific and definite results. Such integrated actions may include, but are not limited to, marking the status of the conversation, marking a part of the conversation as a decision with which the users agree, deleting the conversation, managing the conversation, editing the conversation, granting various action permissions to various users, opening or closing the conversation, concluding the conversation, saving the conversation, searching for previous conversations, generating statistical and measured data based on the conversation, starting another related conversation, triggering actions by a third party work flow system, and the like.

17 Claims, 5 Drawing Sheets

CONVERSATION-INTEGRATED ACTION ITEMS IN SOCIAL NETWORKS

TECHNICAL FIELD

This application relates generally to social networks. More specifically, this application relates to action items and tasks integrated with a conversation on social networks to achieve particular results.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
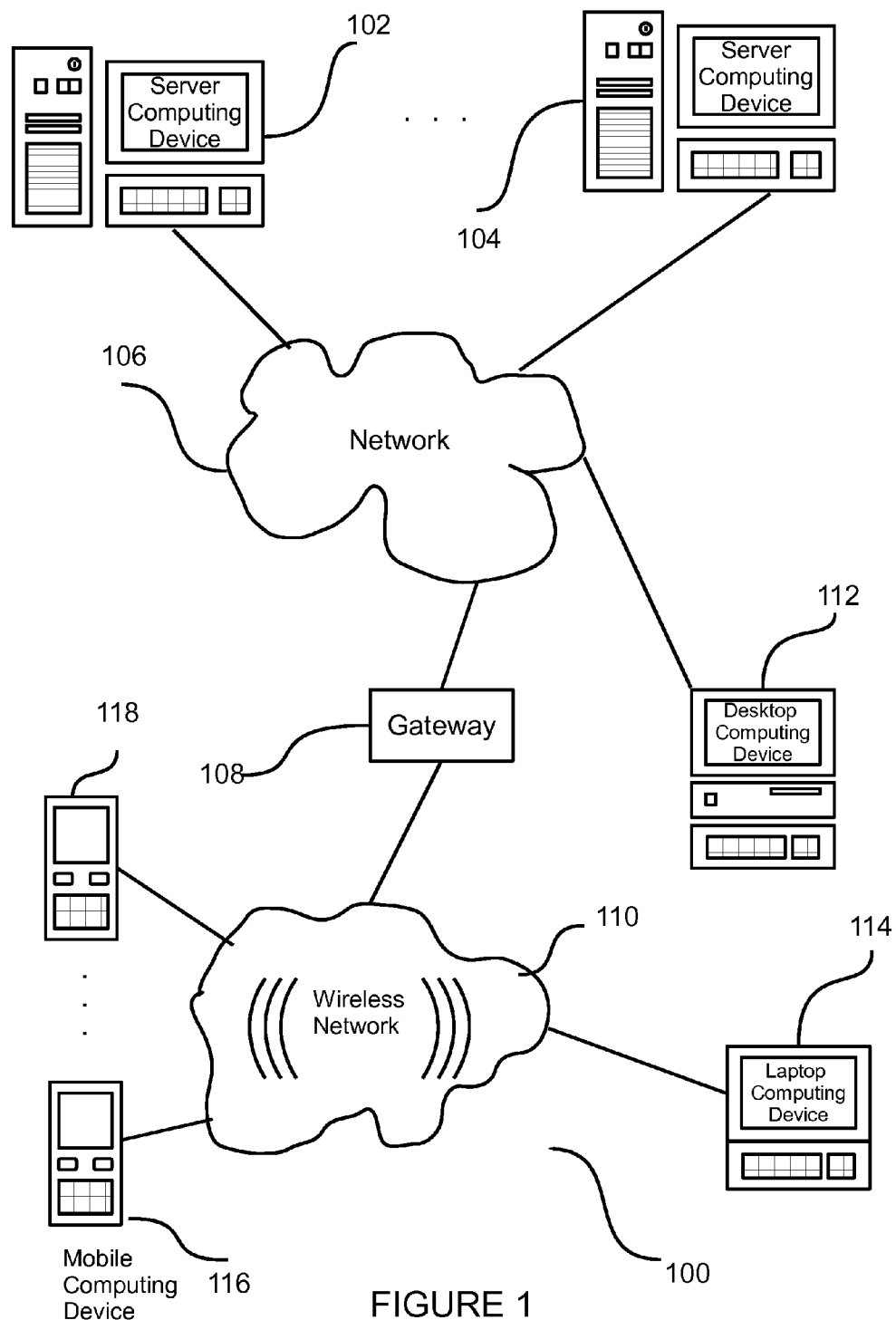
FIG. 1 shows an embodiment of a network computing environment wherein the disclosure may be practiced.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references online messaging and written conversations using laptop computers or other computing devices, it will be appreciated that the disclosure may be used with other modes of conversation and other computing devices such as spoken or oral communications using mobile devices like smartphones.

Briefly described, a device and a method are disclosed including Conversation-Integrated Action System (CIAS) having networking facilities to allow multiple remote users of a social network to enter into a social conversation. In various embodiments, CIAS is further configured to allow specific and relevant actions to be presented with respect to the conversation to achieve specific and definite results. Such integrated actions may include, but are not limited to, marking the status of the conversation, marking a part of the conversation as a decision with which the users agree, deleting the conversation, managing the conversation, editing the conversation, granting various action permissions to various users, opening or closing the conversation, concluding the conversation, saving the conversation, searching for previous conversations, generating statistical and measured data based on the conversation, starting another related conversation, triggering actions by a third party work flow system, and the like. Each action may apply to the whole conversation or only to selected comments within the conversation, as appropriate.

With the ubiquity of computing devices with rich GUI, such as powerful smartphones, laptop computers, computing pads and tablets, among others, and widely available high speed computer networks, access to information is easier than ever. Using these devices and the Internet to communicate, may generate a large volume of data and allow many potentially valuable interactions between the participating users. However, much of the conversation, especially on the social networks, take place in a computing environment in which definite actions and outcomes are not an integrated part of the environment and hence, may not result from user interactions. As such, much of the conversation may be wasted and repeated over and over again by others due to the lack of a structured action and outcome facility and due to not saving the conversation based experience. The experience may include the content of the conversation itself in addition to the actions taken and the results achieved. Taken together, the conversation, the actions, and the results may create an experience pattern applicable to future conversations which may be different in subject but similar in structure and process.

Therefore, having integrated and recognized actions and results associated with conversations taking place in a social network environment, and the storage of such conversation-based experiences for future reference and use can be highly valuable.

Illustrative Operating Environment

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), and any future generation radio access technologies for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
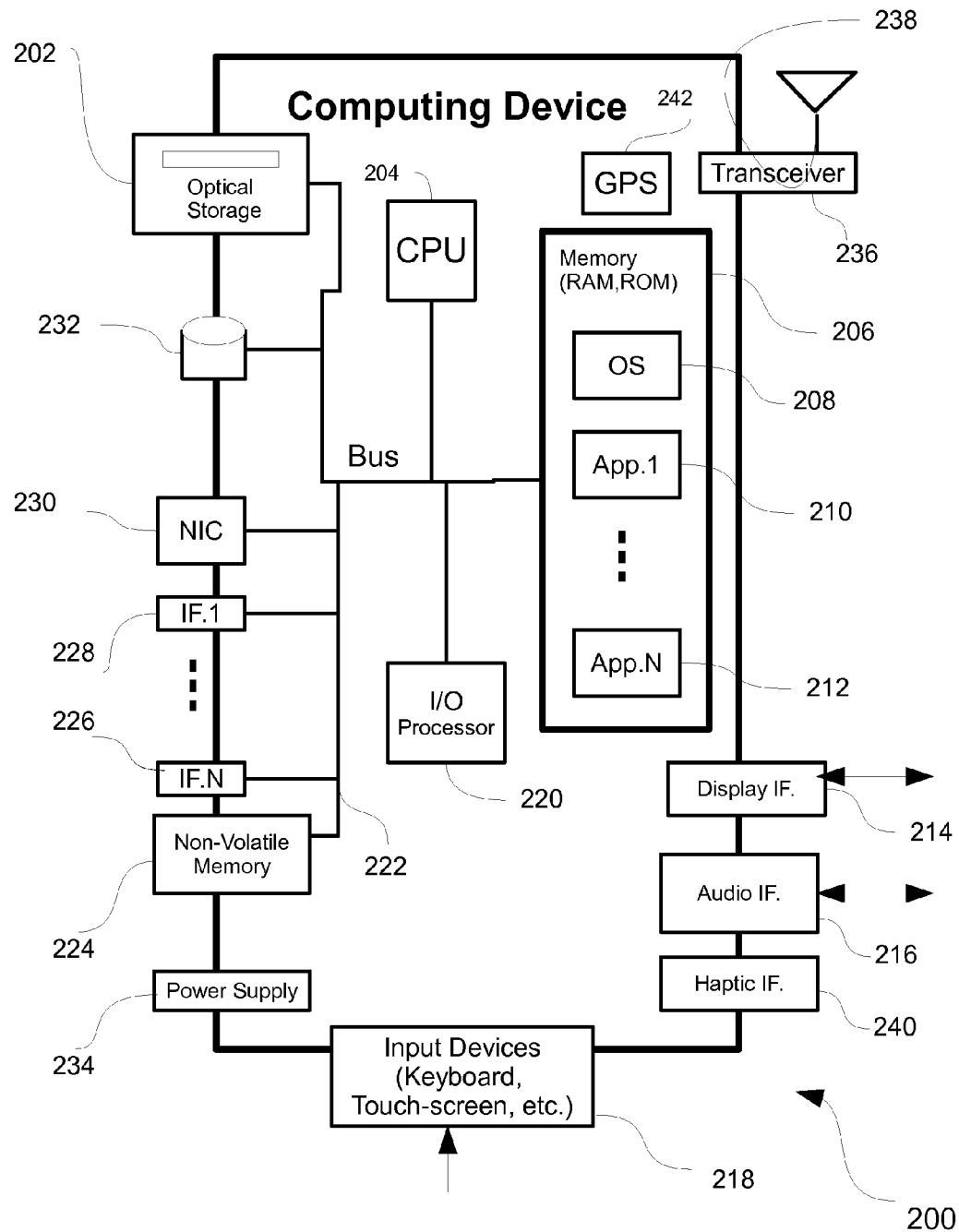
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
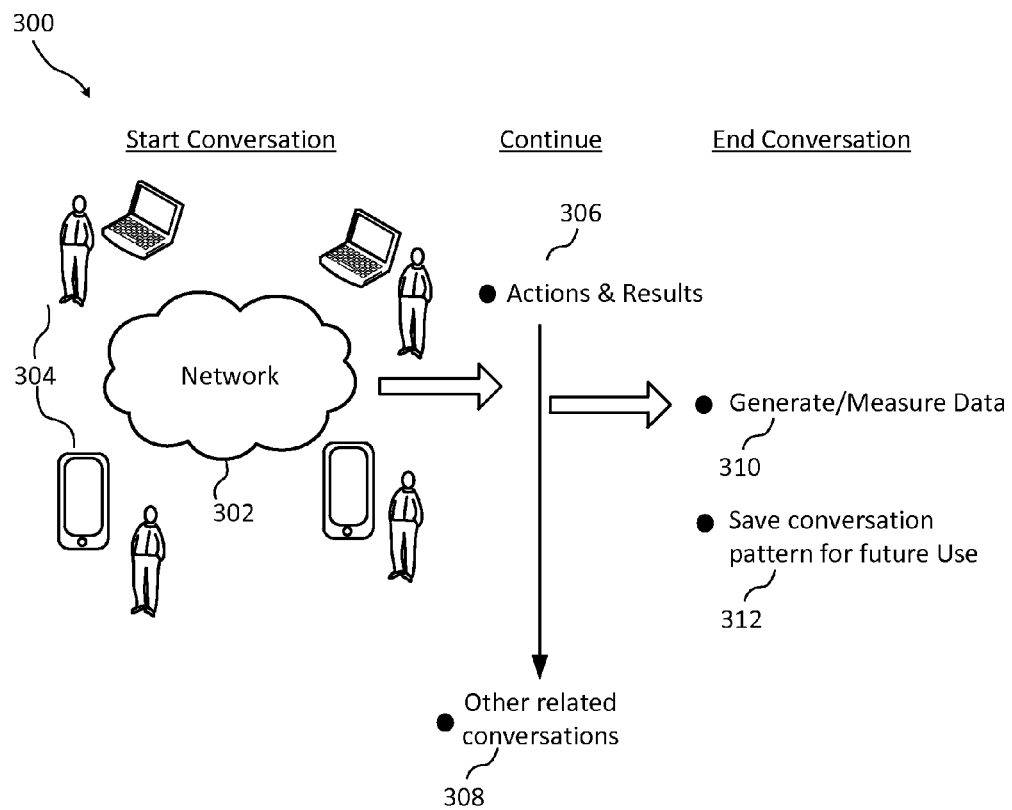
FIG. 3 shows an example Conversation-Integrated Action System (CIAS) integrated with a social network and configured to present specific action items for participants in a conversation.

FIG. 3 shows an example Conversation-Integrated Action System (CIAS) integrated with a social network and configured to present specific action items for participants in a conversation. In various embodiments, CIAS 300 includes a network 302 through which multiple users start an online parent conversation via their client computing devices 304 connected to the Internet or another computer network. The conversation continues and includes specific actions and results 306 defined in the context of the conversation. Other related child conversations 308 may be started as a result of the actions generated in the parent conversation. At the end of the parent and/or the child conversations various types of data and measurements 310 may be generated. The parent and/or the child conversations may be saved in various forms and patterns 312 for future reference and use.

In various embodiments, CIAS 300 may be integrated with and be an integral part of an online messaging system, such as various social networks, like Facebook™ and Google+™, while in other embodiments, CIAS may a browser plugin component configured to add functionality to such messaging systems, as further described below. CIAS may be implemented and displayed by a hardware and/or software system using one or more software components executing on the illustrative computing device of FIG. 2. One or more functions may be performed by each software module loaded into and executed from memory 206 similar to application software modules 210-212 shown in FIG. 2.

For example, one or more separate software components may be used for each of the functions to manage the remarks of each user in the conversation, action menus, present a user interface, display status, search for past conversations, filter search results based on various parameters, and may perform any other function needed to carry out and implement the functions of the CIAS described herein. Those skilled in the art will appreciate that one function may implemented using multiple software modules or several functions may be implemented using one software module.

In various embodiments, CIAS may be a software plug-in component integrated with a web browser or a dedicated and independent third party software application used to interact with social networks on a client computing device such as a laptop personal computer, a tablet device, a smartphone, or other mobile computing devices. In other embodiments, CIAS may be a component integrated at server level within a particular social network facility, which is presented to a user of the social network as part of the user interface. Such facility may be part of the web services of the social network.

In various embodiments, multiple participants may start a conversation via a social network. A conversation may be made up of a sequence of remarks by the participants on one or more subjects of the conversation. Each remark may define a matter based on its informational content, decision content, action content, recommendation content, other types of contents, or a combination thereof. As such, the content of a remark may be defined as an option associated with the subject of the conversation by marking the remark as the meaning or content of the selected option.

For example, if a remark asks for a particular action to be taken towards achieving an objective of the conversation, then selecting an Action Item option from the Options menu associated with the remark designates that remark as an action item which may be performed, followed, tracked, evaluated, edited, modified, and otherwise processed as an integral part of the conversation, as further described below with respect to FIGS. 5-7. Such action items, defined by the contents of the remarks, may be assigned to one of the participant by a moderator of the conversation or be accepted and committed to by an individual participant based on the individual participant's own decision.

In various embodiments, the actions associated with the conversation may be predefined. For example, actions such as Delete Remark, Mark as Decision, and the like may be generically defined for all conversations, while other actions are defined by the contents of the remarks, as described above. In some embodiments, actions may be predefined by the users or administrators, while in other embodiments, the actions may be predefined in the software system prior to being released to users. The ability to define actions may be useful in organizations or among close friends who often converse on particular subjects or types of subjects. This way, actions may be predefined by users, which are suitable for the typical subjects of conversation by the users. For example, if a group of users often talk about travel arrangements, actions such as Buy Tickets or Get Maps, may be predefined for all such conversations. As another example, in a financial institution, conversations may often revolve around financial or economic subjects. In such an environment, the users or the administrator may define actions such as Obtain Profit & Loss Statement or Get Interest Rate, which may be meaningful in most conversations.

The CIAS, in effect, turns a social conversation into an informally managed and coordinated group project with assigned action items and measurable results. As noted above, the matters defined by the remarks may include decisions, helpful information, recommendations, references to other information, and the like. Each remark may be marked as one or more of these matter types. For example, a remark may be marked as a helpful hint, as a decision, or as an action. In some embodiments, the matters so defined may be reviewed, edited, annotated with side notes, linked to another remark or conversation, deleted, or otherwise changed.

In various embodiments, matters defined by participant remarks may be used to start a new conversation with its own set of matters similarly defined. The original conversation may be regarded as a parent conversation while the new conversation may be regarded as a child conversation. This generational model may be extended to any number of levels practicable. So, a child conversation may spawn its own set of one or more child conversations. Typically, the matters which are action items may result in a new conversation in the course of carrying out the action. For example, if a participant accepts an action assigned to him, he may need to start other conversations with some of the same or other people to perform the action. Thus, a child conversation may be created.

In view of this relationship between the parent and child conversations, any conversation can be a part of a bigger project or conversation. This way, a casual and/or social conversation by participants in an existing project may be integrated with the project without the formal constraints of project meetings, project management, and processes. For example, participants in a project may chat on a social network about the day's work later in the evening and come up with beneficial ideas during the informal chat. CIAS makes it possible to integrate such informal conversation and the associated actions and decisions into the project without all the project tools and participants and preserve the ideas that are encountered in an informal setting.

Having a messaging environment in which structured actions and resulting outcomes may be freely defined by the participants, a casual social conversation may start a new group project or initiative with specific objectives that the participants are interested in. For example, groups of people engaged in a conversation about education, recreation, business, environment, and the like, can benefit more from their conversation if they can assign and track actions, and monitor and achieve outcomes, than just making remarks which are not maintained or managed, and thus, may not result in any objective or measurable benefits or outcomes. A structured social conversation environment, such as that created using CIAS, systematically extracts the information and benefits of the contents of a social conversation.

In various embodiments, the state of the conversation and its related data and meta-data may be preserved to serve as a model, a template, a base, or a tool in future conversations. The state of the conversation may include the content of the conversation, the subject of the conversation, the participants' identities or roles, the actions suggested during the conversation and/or the actions actually performed, the decisions made, the results achieved, other child conversations started, time and text length of the conversation thread, geographic or organizational distribution of the participants, frequency of each participants' participation in other conversations, other various statistical data such as histograms of number of remarks made by each participant, among other data. Those skilled in the art will appreciate that many other meta data and statistical data may be generated from a conversation without departing from the spirit of the present disclosures. For example, The time distribution of the conversation, the total number of words and number of remarks, total number of actions, total number of decisions, number of reversed or edited decisions, and the like, may be extracted from the conversation.

In various embodiments, some of the preserved data may persist beyond the life of the conversation in the form of conversation patterns defined by some or all of the above-mentioned data associated with the conversation. Conversation patterns may be defined and associated with conversation categories according to certain predefined criteria such as the subject, the results, the number of participants, the type and number of actions, and the like. When another conversation is predicted to fall in a particular category, for example, by the conversation subject or goals, then the conversation pattern associated with that category may be made available as a model or a tool to guide the new conversation by providing relevant information such as the likely actions needed, the decisions, the helpful information, and the like, from the conversation pattern for the particular category. Such relevant information, such as some of the actions and decisions, may be highly relevant and be adopted by the new conversation right away instead of repeating the same pattern others have followed in previous conversations only to arrive at the same actions and decisions. This way, relevant portions of past experience, in the form of conversation patterns, may be applied to new and similar conversations, saving time and effort and benefiting from accumulated experience and wisdom.

In various embodiments, meta statistics and other meta data may be extracted and saved from across multiple conversations and/or conversation patterns to assess the usefulness and quality of the criteria used to generate the conversation patterns. For example, such meta statistics may be collected with respect to the average number of remarks or the average number of participants across many conversations. Such meta statistics may or may not indicate that the number of remarks may be a good indicator of the quality of results achieved by the conversation.

In various embodiments, the actions and decisions created in the course of a conversation may be directly and explicitly related or linked to the results of the conversation. Such links may become part of the conversation pattern or template. The linking of the actions and decisions to the results or outcomes of the conversation effectively turns the social conversation into a project with appropriate actions, decisions, controls, and structured outcome. The structured outcome resulting from such recognized and organized actions and decisions is in contrast to ad-hoc outcomes of a common social conversation.

In various embodiments, conversation patterns may be presented to the participants as graphical component such as an icon that when selected causes a dialog box to appear and present choices for adopting an action or a decision. In other embodiments, the elements of the conversation pattern may be presented as an integral item on an action menu further described below with respect to FIGS. 5-7 below.

In various embodiments, the actions, decisions, or results of a conversation may be related and/or applicable to a third party software application or process. Accordingly, in some embodiments, the conversation may be linked to the third party application using a special software interface, a software plugin component integrated with the third party application or the CIAS or both, functions in an Application Programming Interface (API), or other software modules communication methods.

In some embodiments, the CIAS may have a built in software interface to work with a particular or predetermined third party program. For example, in a sales organization, the CIAS may include an API, a plugin, or other type of software interface to communicate with a Customer Relationship Management (CRM) system used by the organization. In such an arrangement, a conversation between sales people which includes an action item to contact a customer, may utilize the interface to the CRM to present relevant information about the customers to the participants, take some actions within the CRM such as set an appointment with a particular customer in the CRM, and the like, all as a part of some of the actions assigned in the conversation. In other embodiments, a software plugin component may be installed on the CIAS or the third party application, after software release, as needed. In still other embodiments, a web service may be used by the CIAS, the third party application, or both to achieve the needed communications between the two.

As another example, staff participating in a web design project may use CIAS to capture useful ideas, algorithms, and techniques that come up during a casual or social conversation and integrate them into the project without having to repeat the same conversations in a more formal project environment.

Similarly, in various embodiments, the CIAS may have a built-in software interface, such as an API, a plugin, or other type of software interface to communicate with a Social Task Management System (STMS) used by an organization, a corporation, or an enterprise concern. STMS is generally used to share tasks and action items with others on a network, typically visible to other participants. In such an arrangement, a conversation between people which includes various action items resulting from the conversation may extend to and utilize the STMS to further manage the actions or create further visibility to the resulting actions and outcomes. This extension of actions and tasks into the STMS from CIAS may further allow sharing and coordination of tasks with other people and projects, as relevant. Those skilled in the art will appreciate that the software configuration needed to achieve the objectives of CIAS in relation to STMS may be similar to those discussed above with respect to CRM.

In addition to the integration of actions within a conversation with third party application actions, as described above, the results or outcomes of a conversation may also trigger the start of a process in another software application such as a work flow management software application, CRM, or STMS. For example, a conversation may result in the decision to purchase some equipment, which may in turn automatically trigger a purchasing work flow within the work flow management application.

Figure 4:
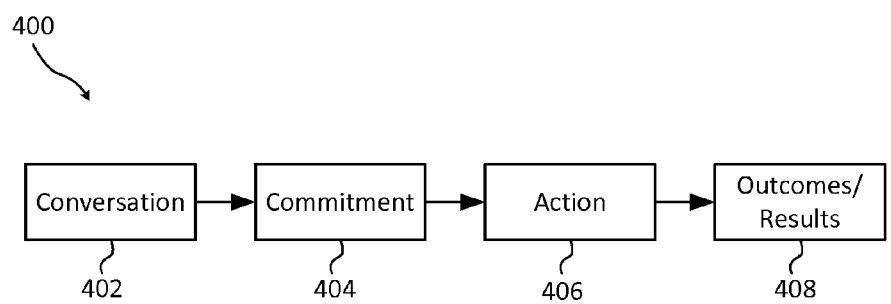
FIG. 4 shows an example process flow showing the transformation of a social conversation to definite results.

FIG. 4 shows an example process flow showing the transformation of a social conversation to definite results. In various embodiments, process flow 400 includes conversation 402, commitments 404 to actions 406 by participants in the conversation, and structured outcomes or results 408.

In various embodiments, process flow 400 depicts the relationships between the main aspects or components described with respect to FIG. 3, in a simplified and streamlined fashion. At a high level, typically, a social conversation starts, commitments are made to actions defined within the conversation itself or predefined and assigned as appropriate, actions are carried out possibly commencing other child conversations, and outcomes result. All of these activities and results may be recorded in a storage facility as conversation patterns for future use, as described above with respect to FIG. 3.

Figure 5:
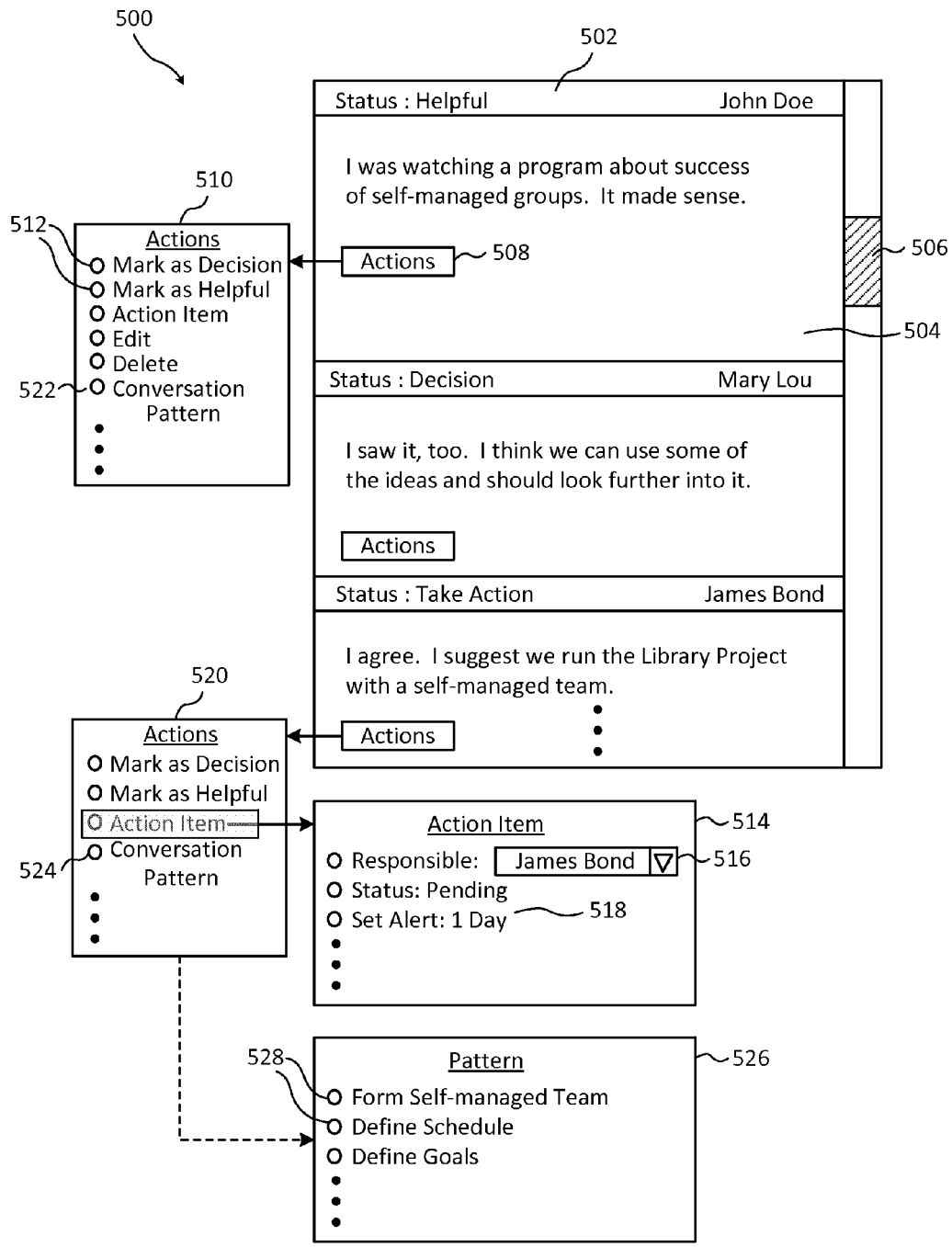
FIG. 5 shows an example Graphical User Interface (GUI) configured to provide the facilities for a conversation on a social network with integrated actions.

FIG. 5 shows an example Graphical User Interface (GUI) configured to provide the facilities for a conversation on a social network with integrated actions. In various embodiments, GUI 500 may be a part of the CIAS and may include a conversation thread 504 with multiple remarks by various participants, each remark having status information 502 and embedded action buttons 508. Invoking actions using action button 508 may cause a first level dialog or Options/Actions menu 510 to appear presenting multiple options 512 including saved conversation patterns 522. Some of the items in the Options or Actions menu 520 may cause the appearance of a second level or cascaded menu 514 of other options/items related to the item on the Actions menu to appear. The second level menu 514 may include the identification for a responsible party 516, reminder 518, and other relevant items. Selecting conversation pattern 524 may cause a dialog box to be presented with action items, decisions, or other information from previous conversations for adoption into the present conversation.

Those skilled in the art will appreciate that many other user interfaces may be presented to the users for selecting various action types without departing from the spirit of the present disclosure. For example, each of the action types or conversation options may be presented as a separate graphical control, such as a button, an item in a drop down list, and the like. Another user interface implementation may include separate menus to present each of the action types. For example, a menu may be presented for an assignable action items, another for decisions, and another menu for other matter types.

In various embodiments, a user may start a conversation on a social network integrated with the CIAS as described above using various techniques. The CIAS GUI 500 may be presented as a mutual dialog pane showing the same information to all participating users as a thread of conversation. In some embodiments, each user may choose an option from the Options menu 510 or 520, launched by the corresponding remark's action button 508, related to some aspect or characteristic of the conversation. Each user may choose an option to designate a remark by himself or other users as a particular type of remark, such as a decision, as an assigned action, as informational, or other designations appropriate for the subject of the conversation. In other embodiments, a conversation moderator or an administrator may be requested by the users to designate a remark as a particular type. For example, the user may choose menu option "Mark as Decision" from Options menu 510 to designate his or another remark as a decision in the present conversation.

In various embodiments, the action button 508 may cause a dialog box for Options menu 520 to appear and give the user various options and actions the user may choose from. Some of the options appearing in dialog box 520, when selected, may cause a second dialog or information box 514 or 526 to appear providing further relevant actions or information for the item selected. For example, if a user selections Action Item from dialog box 520, a cascaded or second Action Item dialog box 514 may appear to collect further information about the selected Action Item, such as name of responsible party 516 for the action item, status of the action item, a reminder or alert 518 for the action item, and the like.

Those skilled in the art will appreciate that the dialog or information boxes may cascade many levels without departing from the spirit of the present disclosures. For example, an item on the second dialog box 514, when selected, may cause a third dialog or information box, or other user interface such as a new webpage, to appear to provide further information, collect information from the user, and/or present still further action items or other options for selection by the user.

In various embodiments, action items, decisions, advice, or other types of information may be available from previous conversations that have relevance to the current conversation based on various criteria. The criteria for relevance of a previous conversation to the current one may include similar or related subject of the conversation, common participants, common organization or project, similar processes or actions that need to be taken, similar results, and the like.

In various embodiments, previous conversations may be stored and/or presented for selection by participants in a new conversation as a conversation pattern defined or characterized by one or more of subject, content, summary of contents, participants, organization involved, project, process, action, sequence of actions, outcomes, results, statistical parameters such as frequencies of remarks and various actions and decisions among others, date of conversation, length of conversation, and any other parameters, information, or meta data which may help in characterizing and identifying a conversation for the purpose of saving and using later in similar conversations. The participants of a new conversation may then be automatically presented by the CIAS with a list of potentially relevant conversations from the past to select from.

In various embodiments, the conversation patterns generated based on past conversations may be applied to a present conversation as a template, via which action menus such as those appearing in dialog boxes 510 and 520, may be adopted for use in the new conversation. In other embodiments, portions of the contents of past conversations, based on which corresponding conversation patterns were generated, may be adopted into the new conversation to streamline the path to the outcome and avoid repeating the same points and remarks by various participants. In still other embodiments, an entire record of a past conversation may be included in the conversation pattern presented to the participants in a current conversation. The entire record of the past conversation may include all the remarks, list of participants, meta information such as statistics and list of actions taken, decisions, outcomes, and the like.

In still other embodiments, the participants in a new conversation may be allowed to choose how much or what part of a conversation pattern they want to view in the context of their own current conversation and how they would like to apply the presented information from the conversation pattern to their own conversation. For example, if the conversation pattern includes the entire record, then the users may only choose to look at the results or the decisions made. In such embodiments, filters may be provided in the user interface to allow the users in the current conversation filter and use only the type and scope of information they are interested in at the time. The filters may be adjusted in real time to allow more or less information to be presented as needed during the course of the conversation. This allows adaptive application of the conversation pattern to the present conversation as the present conversation progresses.

In other embodiments, CIAS may automatically filter the conversation pattern based on decisions made, actions taken, meta data, or other information associate with the present conversation. Such adaptive and automatic filtering may be limited to parameters and information within a selected conversation pattern or be applied to across conversation patterns allowing the automatic selection and presentation of different conversation patterns to the present conversation as it progresses and changes. In various embodiments, CIAS may include a conversation pattern matching software module configured to continuously match a present conversation as it progresses with a bank of stored conversation patterns to present and/or apply the most relevant conversation patterns to the participants in the current conversation.

Figure 6:
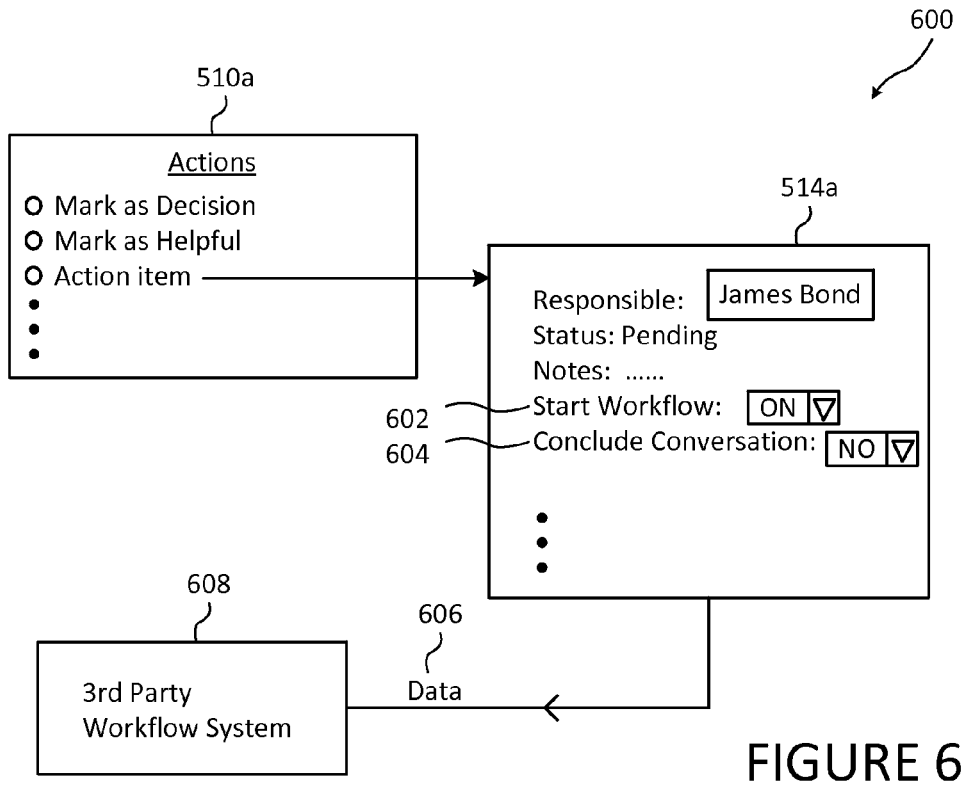
FIG. 6 shows an example GUI of CIAS of FIG. 3 configured to trigger a workflow system.

FIG. 6 shows an example GUI of CIAS of FIG. 3 configured to trigger a workflow system. In various embodiments, external system triggering GUI 600 may include an action items dialog box 510*a*, one of which items may launch a second dialog box 514*a* having option to Start Workflow 602 and an option to end the conversation 604, which may transmit data 606 to and/or trigger a third party workflow system 608.

In various embodiments, a conversation with structured outcome having action items, decisions, informational tips, and the like, as described above, may effectively be or become part of a larger project. In this context, the results or outcomes of such a conversation may not be merely an end to the conversation but the start of a new process in a related and/or independent system. A number of participant in a social conversation may produce ideas, decisions, and/or actions that need to be followed up using other systems, techniques, and/or people, by triggering or starting a related process in an external system or organization, relative to the conversation. For example, a social conversation may result in the decision or action item that a company needs to purchase some equipment or software for better performing a project. Such an outcome may be directed to trigger the workflow management system 608, and/or STMS and CRM to continue the process of purchasing such equipment or software as part of purchasing workflow or a project implementation workflow.

In various embodiments, particularly in a corporate or enterprise setting, access to various projects and related materials may often be controlled through enterprise-level authorization mechanisms, such as permissions associated with files, access lists of people authorized to access various resources, permission tokens, and the like. In such environments, CIAS may provide facilities and interfaces for defining or setting new permissions, creating access lists, or provide other types of authorization for participation in a conversation, assigning or accepting tasks and actions, or allowing other systems, such as workflow management system, STMS, CRM to be triggered by the conversation.

In other various embodiments, the boundaries of authorizations and permissions may also be set. For example, on a social network, authorization may be set so that there may be fewer or no permissions required to participate, but if the actions and tasks extend to other enterprise systems, such as STMS or CRM, then more restrictive permissions may be needed to participate. Thus, permission levels may be different depending on the systems with which a user interacts. With such an arrangement, the security of data and other resources belonging to an organization or enterprise are better protected from indirect access through a social networking conversation.

Figure 7:
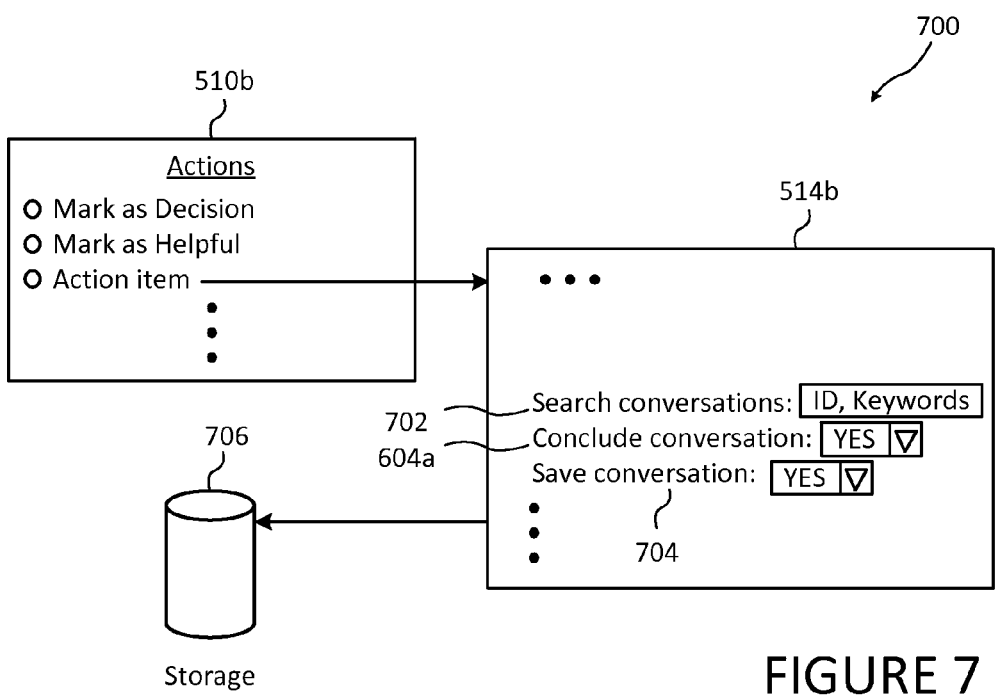
FIG. 7 shows an example GUI of CIAS of FIG. 3 configured to allow saving a conversation and searching for previous conversations.

FIG. 7 shows an example GUI of CIAS of FIG. 3 configured to allow saving a conversation and searching for previous conversations. In various embodiments, conversation storage GUI 700 may include an action items dialog box 510*b*, one of which items may launch a second dialog box 514*b* having option to Search Conversations 702, an option to end the conversation 604*a*, and an option to Save the present conversation 704 to a storage unit 706.

In various embodiments, once a conversation ends and appropriate actions have been assigned, decisions made, and structured outcomes achieved, it may be desirable to save the conversation data and/or generate a conversation pattern from the relevant data and statistics associated with the conversation. In various embodiments, the participants or moderator (or system administrator) may explicitly conclude the conversation using a menu item Conclude Conversation 604*a* and then use Save Conversation 704 menu item to generate and store a conversation pattern based on the concluded conversation. In other embodiments, the CIAS may detect the end of the conversation, for example, via automatic detection of predetermined outcomes or inactivity in the conversation for a predetermined period of time or the like, and close down the conversation without direct user instructions or commands.

In various embodiments, appropriate software modules associated with CIAS may be used to implement concluding, saving, and searching for conversations. In some embodiments, such software modules may be an integral part of the CIAS, while in other embodiments, the software modules may be separate but designed to work with CIAS, such as DLL (Dynamic Link Library), web service, or independent software applications with exposed API (Application Programming Interface) for use by CIAS. For example, a termination software module may be used to close the conversation, stop participants from posting to the conversation thread, providing termination messages to the users, releasing computing facilities such as memory and computing threads, and the like.

Similarly, a conversation pattern generator software module may be used to create a conversation pattern based on one or more of subject, content, summary of contents, participants, organization involved, project, process, action, sequence of actions, outcomes, results, statistical parameters such as frequencies of remarks and various actions and decisions among others, date of conversation, length of conversation, and any other parameters, information, or meta data which may be useful in defining or characterizing a conversation pattern for at least the purpose of applying the pattern to future conversations, or any other useful purposes such as generating statistics and metadata about a large number of separate conversations in an organization, on a subject, among particular participants, and the like.

In various embodiments, a conversation pattern search software module may be used to search for conversation patterns based on various criteria. The search criteria may be substantially similar to the filtering criteria for listing the relevant conversation patterns. Such search and/or filtering criteria for a new or current conversation may include subject, participants, organizations involved or represented, actions defined, decisions, desired outcomes or results, statistical parameters such as number and average length of remarks, metadata such as date of conversation and geographic areas of participants, and any other criteria suitable for matching potentially unrelated but similar conversations which have common characteristics with respect to some aspect of the conversation, such as the criteria describe above.

In various embodiments, the conversation pattern including its associated data and metadata may be stored in a local or remote permanent storage facility 706, such as databases, disk, tape, or optical archives, and the like.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A Conversation Integrated Action System (CIAS), the system comprising:
   a computing device including a processor;
   a user interface software module, coupled with an online messaging system, that when executed on the computing device causes the computing device to:
   present, to participants in an online conversation, options related to aspects of the online conversation;
   wherein selecting at least one of the options indicates that an action associated with the conversation is identified to be performed; and
   wherein selecting at least another one of the options indicates a type of a remark within the conversation,
   wherein the CIAS is integrated with the online messaging system,
   wherein the messaging system is a social network and the online conversation includes results related to the group project,
   wherein selecting at least one of the options comprises marking a remark within the online conversation as an action related to the group project, wherein the group project comprises actions, decisions, controls and structured outcomes.

2. The system of claim 1, wherein the CIAS is a browser plugin software component.

3. The system of claim 1, wherein the online messaging system is a social network.

4. The system of claim 1, wherein the computing device is a mobile computing device.

5. The system of claim 1, wherein the options comprise at least one of actions, decisions, and informational content.

6. The system of claim 5, wherein the actions, decisions, and informational options comprise a remark by a participant in the online conversation.

7. The system of claim 1, wherein the CIAS is configured to allow a structured outcome of the online conversation to result from selecting at least one of the options.

8. The system of claim 1, wherein the CIAS is configured to allow aspects of the online conversation to be saved as a conversation pattern applicable to future conversations.

9. A method of performing an online conversation, the method comprising: using a Conversation Integrated Action System (CIAS), coupled with an online messaging system, configure to present to participants in the online conversation options related to aspects of the online conversation;
   selecting at least one of the options to indicate that an action associated with the conversation is identified to be performed; and
   selecting at least another one of the options to designate a type for a remark within the conversation,
   wherein the CIAS is integrated with the online messaging system,
   wherein the messaging system is a social network and the online conversation includes results related to the group project,
   wherein selecting at least one of the options comprises marking a remark within the online conversation as an action related to the group project, wherein the group project comprises actions, decisions, controls and structured outcomes.

10. The method of claim 9, wherein the online messaging system is a social network.

11. The method of claim 9, wherein the CIAS is integrated with the online messaging system.

12. The method of claim 9, wherein selecting the at least one of the options comprises marking remarks by the participants as a selected option.

13. The method of claim 9, further comprising generating a conversation pattern based on the online conversation.

14. The method of claim 13, further comprising saving the conversation pattern for applying to future conversations.

15. A method of coordinating a group project, the method comprising: using a Conversation Integrated Action System (CIAS), coupled with an online messaging system, to present, to participants in an online conversation, options related to aspects of the online conversation;
   wherein selecting at least one of the options indicates that an action associated with the group project is identified to be performed; and
   wherein selecting at least another one of the options indicates a type of a remark within the conversation,
   wherein the CIAS is integrated with the online messaging system,
   wherein the messaging system is a social network and the online conversation includes results related to the group project,
   wherein selecting at least one of the options comprises marking a remark within the online conversation as an action related to the group project, wherein the group project comprises actions, decisions, controls and structured outcomes.

16. The method of claim 15, wherein using the CIAS comprises using a smartphone to access the online messaging system and to select options.

17. The method of claim 15, wherein the options comprise at least one of actions, decisions, and informational content.

* * * * *